May 28, 1957 A. KÄCH 2,794,150

TUNING ARRANGEMENT FOR SINGLE CIRCUIT MAGNETRON

Filed Jan. 18, 1954 2 Sheets-Sheet 1

INVENTOR
ALFRED KÄCH,

BY Pierce, Scheffler & Parker,
ATTORNEYS.

May 28, 1957 A. KÄCH 2,794,150

TUNING ARRANGEMENT FOR SINGLE CIRCUIT MAGNETRON

Filed Jan. 18, 1954 2 Sheets-Sheet 2

INVENTOR
ALFRED KÄCH,

BY Pierce, Scheffler & Parker,
ATTORNEYS.

2,794,150

TUNING ARRANGEMENT FOR SINGLE CIRCUIT MAGNETRON

Alfred Käch, Baden, Switzerland, assignor to "Patelhold" Patentverwertungs- & Elektro-Holding A.-G., Glarus, Switzerland, a joint-stock company Application January 18, 1954, Serial No. 404,655

11 Claims. (Cl. 315—39.61)

The present invention relates to a tuning arrangement for a single circuit magnetron.

More particularly the present invention relates to a tuning arrangement for a single circuit magnetron which utilizes a line connected to the single cavity of the magnetron which line consists of two sections having dissimilar characteristic impedances, and of which one section may be adjustable for purposes of varying the frequency of oscillations of the magnetron.

By the term "single circuit magnetron" is understood herein a magnetron whose resonator consists of a single cavity in contradistinction to those types of magnetrons which are called multi-cavity magnetrons. Such a magnetron is described, for example, in Patent No. 2,579,593, Fritz Lüdi, issued December 25, 1951.

In accordance with the disclosure of the Swiss Patent 230,996, filed March 17, 1943, it is possible to connect to the cavity of such a magneron a lecher-wire line, which permits variation of the frequency produced by the magnetron by varying the electrical characteristics thereof, particularly by varying its effective length or the value of an impedance connected thereto.

It is thus possible in particular to tune a magnetron transmitter to a desired transmitting frequency within a certain range. The present invention permits the provision of a particularly large frequency tuning range of the magnetron.

It is accordingly an object of the present invention to provide a tuning arrangement for a single circuit magnetron which permits the variation over a relatively large range of the frequencies produced by the magnetron.

It is another object of the present invention to provide a tuning arrangement for a single circuit magetron which permits a relatively stable and wide range frequency variation by means of a simple lecher line connected to the cavity, wherein the lecher line consists of two sections having dissimilar characteristic impedances.

By connecting a lecher wire to the resonator of a magnetron oscillations at a plurality of frequencies are rendered possible, i. e. for a given adjustment of the tuning arrangement connected to the lecher line, a plurality of transmitting frequencies are possible. In connection therewith usually that frequency finally emerges which is consistent with the most favorable regenerating conditions, which in turn depend with a given magnetic field substantially upon the voltage impressed upon the anode.

Figure 2:
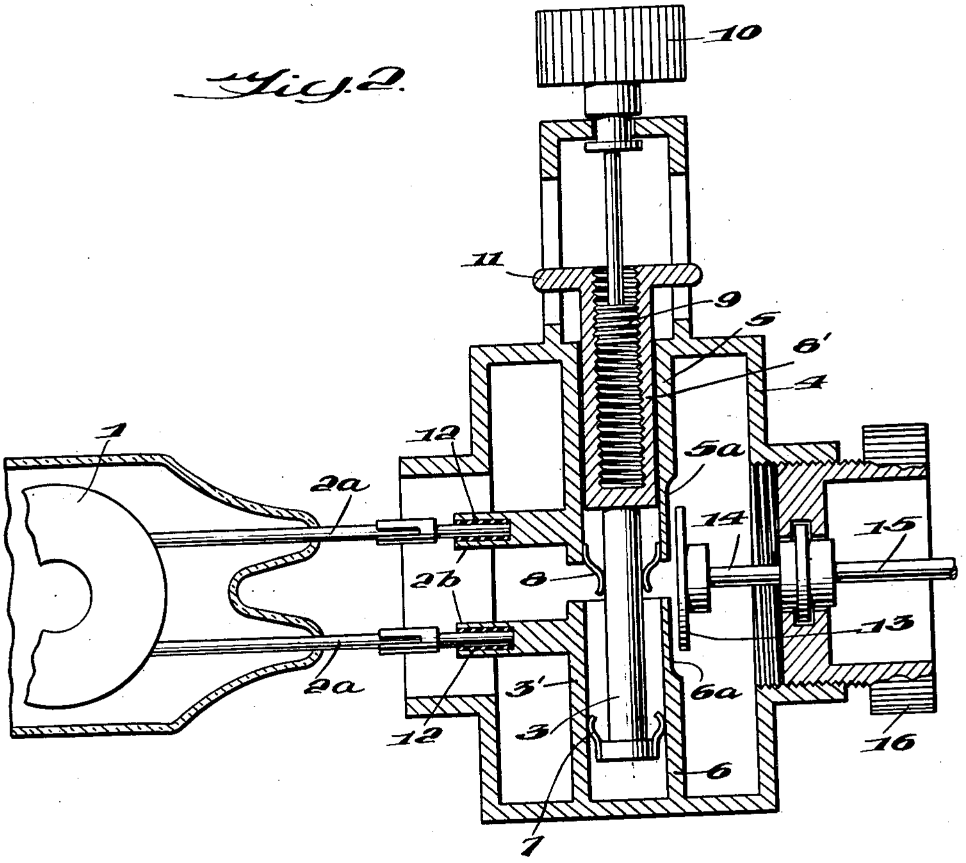
Figure 1:
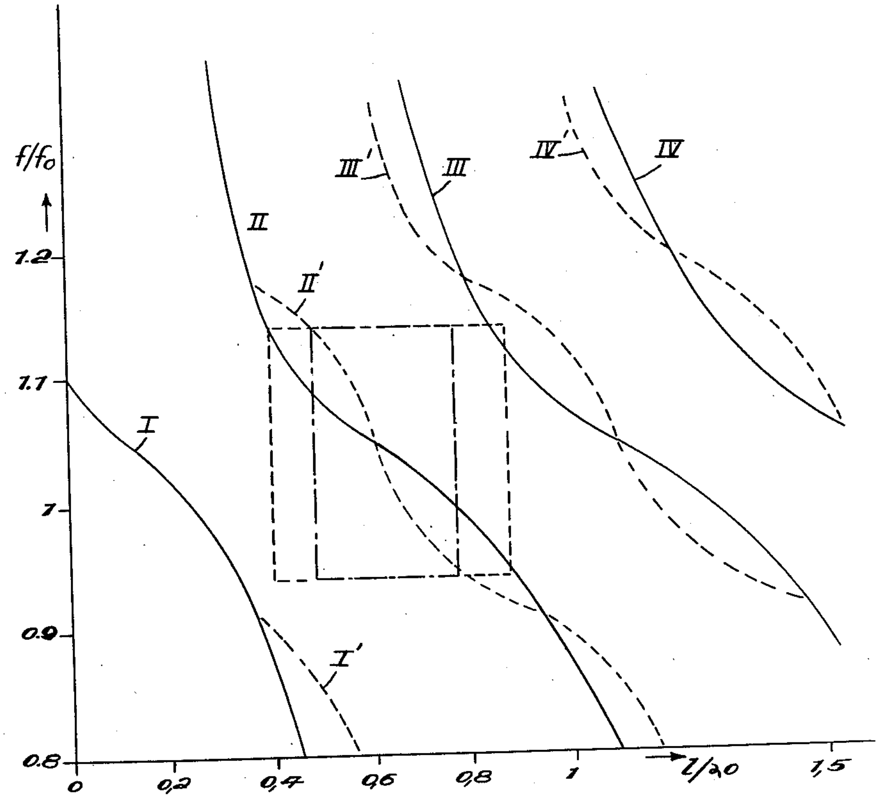

These and other objects and advantages of the present invention and the mode of operation thereof will become more obvious from the following description when taken in connection with the accompanying drawing which shows for purposes of illustration only one preferred embodiment in accordance with the present invention, and wherein:

Fig. 1 shows a graph of the relationship between the frequency as expressed in its ratio to the resonant frequency of the cavity and the length of the lecher line as expressed in its ratio to the wavelength of the cavity; and Fig. 2 shows a cross sectional view of one preferred embodiment of the tuning arrangement in accordance with the present invention.

Referring now more particularly to the drawing, and to Fig. 1 thereof, which shows a typical example of the relationship between the frequency of oscillations of the magnetron expressed in its ratio to the resonant frequency $f_0$ of the resonator without the lecher line, and the ratio of $l/\lambda_0$, wherein $\lambda_0$ is the wave length of the frequency of the resonator without the lecher wire and $l$ the actual length of the lecher wire system, the curves in solid line indicate this relationship with an ordinary single lecher wire system.

The first branch I of the curve which shows the greatest steepness, can be used in practice only for frequencies of $f/f_0$ smaller than one, because the dimensions of the vacuum-tight envelope of the magnetron are such as to prevent a closer approaching of the movable short-circuit along the lecher wire to the resonator. Any tuning in the range of $f/f_0$ greater than one must therefore take place within the range of the second branch II of the solid line curve. Together these two last-mentioned branches provide a relatively large tuning range. However, approximately in the center thereof this tuning range shows a discontinuity or jump from the lowest to the highest frequency. Such a jump or discontinuity is naturally highly undesriable for practical purposes in the operation of a transmitter. If such a jump is to be avoided, the effective tuning must be restricted to a range along only the second branch II of the solid line curve. This does not provide particular difficulties in the frequency range of $f/f_0$ larger than one, but does offer considerable difficulty in the range of $f/f_0$ smaller than one, as already with a frequency of $f/f_0$ approximately equal to 0.9 the second curve as a result of its particular shape and bulging closely approaches the superposed third branch III which, exactly in the same place, shows a curvature or bulge directed in the opposite direction toward the second branch. As a result thereof the useful tuning range is considerably reduced because of the danger that the transmitter frequency may jump from a value of the second to a corresponding one of the third branch. Because of operational conditions a further, certain safety margin must be included in the calculations which necessitates an additional reduction of the useful tuning range.

Generally a tuning range as large as possible is desired. This tuning range depends essentially upon the degree of coupling between the lecher line and the magnetron resonator. An absolute limit is, however, imposed on this increase of the degree of coupling.

In the single-circuit magnetron as disclosed in the above United States patent, the entire flux of the high frequency magnetic field is composed of two parts of which one lies between the outer wall of the toroidal resonator and the anode segments which form the inner cylindrical wall and constitute the capacity of the tuned circuit. The other part of the flux lies however within the anode segments in the space between the anode and cathode. According to experimental findings, the outer field comprises approximately 60% and the inner field approximately 40% of the total flux. As the inner field cannot be varied by the coupling only a coupling degree of 0.6 maximum may be realized.

According to the present invention the distance between the curve branches may be widened in the critical frequency range in the direction of the frequency, i. e. in the direction of the ordinate of the curve branches illustrated in Fig. 1, and therewith the useful tuning range may also be increased by dividing the tuning line which is connected to the cavity of the magnetron into at least two conductor sections, of which that section which inludes the part of the lecher line within the tube has a fixed length, while the second section is variable for purposes of adjusting the frequency, and wherein the second section exhibits a characteristic impedance which is considerably different from that of the first portion as, for example, by a ratio of between 1:4 and 1:10. The fixed length of the first conductor section, that is the distance between the end of the lecher line within the resonator and the point of change in characteristic impedances, preferably approximates $\lambda_0/8$, $5\lambda_0/8$, $9\lambda_0/8$, etc., when the characteristic impedance of the second portion is the greater, but approximates a length of $3\lambda/8$, $7\lambda_0/8$, etc., when the characteristic impedance of the second section is smaller than that of the first section. These relations obtain as well for a line which is short-circuited at its end as for one which is open-circuited. Of all the above-listed lengths possible with the first section, the use of the shortest one is desirable, as it exercises the most desirable effect on the increase of the effective tuning range.

The effect of the change in characteristic impedance with respect to the shape of the tuning curves is also illustrated in Fig. 1. The dotted line curves I'—IV' indicate the relationship of $f/f_0$ in its dependence on the electric length of tuning arrangements when the first conductor section has an electrical length of $3\lambda_0 8$ and the characteristic impedance of the second conductor portion is about ⅛ of that of the first. It is quite clear from Fig. 1 that the second branch II' which is considered for actual use shows a bending or bulging in a downward direction in the critical frequency range, where the transmitter might jump to a corresponding frequency located on the third branch, while the branch III' which lies above the second branch, also shows a change in curvature or bulging in the upward direction. Thus the second and third branches are sharply separated from one another in the critical frequency range when the simple lecher line of Swiss Patent No. 230,996 is replaced by a composite balanced-unbalanced tuning line according to this invention.

The characteristic impedance of the section or part of the lecher wire which is within the tube, as disclosed in Swiss Patent No. 230,996, is relatively great so that, for the practical design of the wide range tuning system, only the choice of a lower value as characteristic impedance for the second section comes into consideration. In accordance with the present invention, at least the second variable section of the line is formed as a low-resistance coaxial line which is connected with the first line by means of a line transformer so as to effect the change from the balanced lecher-wire line of the first section to the unbalanced coaxial line of the second section. The first line section itself is formed at least in part by the lecher line which is located within the magnetron tube. In this manner it is possible to obtain a very great difference in the characteristic impedances of the two line sections and therewith a very favorable influence on the extent of the tuning range.

A practical embodiment in accordance with the present invention is shown in Fig. 2 which represents schematically a preferred embodiment, and wherein reference numeral 1 designates the resonator cavity of a magnetron tube. A lecher line 2a is connected with resonator 1, which line 2a together with parts 2b, which serve as connecting pieces at the exterior of the tube, forms the first line section having a relatively high characteristic impedance. The second line section is formed as a coaxial line which is variable in its electrical length. The line transformer housing 4 constitutes the outer conductor of the coaxial line and the sleeves 5 and 6 in combination with the connecting conductor 3 extending therethrough constitute the variable-length inner conductor of the coaxial line. Thus the line transformer effects a connection between the balanced lecher line 2a, 2b of the first section with the unbalance coaxial line of the second section. The physical length of the inner section of the second line section is variable and determined by the distance between the springs 7 which are fixed on the conductor 3 and engage the conductor 6, and the springs 8 which are fixed at the end of conductor 5 of the transformer and connect it to the inner conductor 3. The conductor 3 is mounted upon a sleeve 8' having an internal thread engaged by a thread 9, which may be rotated by a knob 10. The sleeve 8' is provided with radially extending arms or fingers 11 which slide in cooperating guide slots 11' to prevent rotation of the sleeve 8' and limit it to a longitudinal adjustment.

A particularly favorable arrangement for the actuation of the tuning arrangement is obtained by placing the axis of the coaxial line at an angle, and preferably at a right angle, to the first line section, as shown in the drawing. A further tuning member may be readily provided in the balanced axis of the transformer, which, for example, may serve for the automatic fine regulation of the frequency. This is even more possible, as the greater steepness, which is caused by the jump or bulge in characteristic impedance, produces as a necessary consequence that, for a given tuning range, the necessary change of the length of the second line section is considerably smaller than would be necessary if the whole line were of the same characteristic impedance. The possibility of providing a capacitively acting, fine tuning arrangement between the two inner conductors 5 and 6 of the transformer is also made available thereby. In connection therewith, it is necessary to so dimension the second line section that for no position of the tuning arrangement will a short circuit be established between the ends of the inner conductors 5 and 6; that is, that at this particular space at least approximately a high voltage point is always established.

A preferred example for the fine tuning member is shown in Fig. 2. The fine tuning of the frequency may be effected by a metal member 13, which is fastened by means of insulating piece 14 on an axle or shaft 15. To increase the effect of the fine tuning arrangements two plane parallel surfaces 5a and 6a may be provided on the two inner conductors 5 and 6 of the line transformer. The particular position of the fine tuning member 13 within the transformer, i. e. the distance of member 13 from the two surface 5a and 6a may be adjusted thereby by turning the knob 16 which is threaded into an opening in the outer wall of the transformer 4. The described fine tuning member 13 requires for its actuation only very small forces, and, therefore, is well adapted for actuation by a small servo-motor, not shown, of any known type of automatic frequency control system. Furthermore, it has the advantage that the fine tuning member 13 represents a quasi-stationary element, so that in the transmitter no additional self-resonating frequencies appear.

It is often desirable that the magnetron cavity be electrically separated from the tuning system so that modulation or keying of the produced frequencies may be effected. For that purpose, the two wires 2a may be provided with insulating tubes 12 where they fit within the connecting sockets 2b, the electrical lengths of the insulating tubes being at least approximately $\lambda 0/4$. The insulating tubes 12 represent very small capacities, and, therefore, very high impedances to the modulating frequencies, but, because of the dynamic effects, offer a practical short-circuit to the high frequencies of the transmitter. Preferably these transitional places are formed of ceramic or quartz tubes which, by reason of their very great dielectric constants, have a very small characteristic impedance, and result in a very short mechanical length.

While the jump or change characteristic impedance in the described example is shown at the place of transition from the balanced line to the unbalanced line, it is also possible, to place this jump along any other point of the balanced conductor section.

With an arrangement producing the results shown in the dotted line curves I'—IV' of Fig. 1, a tuning range was realized experimentally which extended between $$f=0.94f_0 \text{ and } f=1.14f_0$$

wherein the frequency $f_0$ was 2000 megacycles per second. This range is shown in Fig. 1 by the narrow dash and dotted rectangle. The improvements obtained by the present invention become obvious from a comparison of this rectangle with the larger rectangle which indicates the same tuning range along the full line curves 11 and 111. It is quite apparent that this dotted line rectangle contains in its upper limit a part of the curve branch 111 and that its lower limit lies in the proximity of the first branch. However, the entire dot and dash rectangle lies at a considerable distance from both adjoining curve branches so inadvertent jumps in the operating frequency are easily avoided.

I claim:

1. A tuning arrangement for a magnetron having a single cavity, said tuning arrangement comprising a line having a balanced section symmetrically coupled to the cavity of the magnetron and an unbalanced section of adjustable electrical length for varying the frequency of the oscillations generated by the magnetron, said balanced section and said unbalanced section having different characteristic impedances and said balanced section having a fixed electrical length substantially equal to $$\frac{\lambda_0}{8}(2n-1)$$

wherein $\lambda_0$ is the resonant frequency wavelength of the magnetron and $n$ is a small integer.

2. A tuning arrangement as defined in claim 1 wherein the characteristic impedance of said balanced section is smaller than that of said unbalanced section and $n$ is a small odd integer.

3. A tuning arrangement for a magnetron having a single cavity, said tuning arrangement comprising a line having a balanced section symmetrically coupled to the cavity of the magnetron and an unbalanced section of adjustable electrical length for varying the frequency of the oscillations generated by the magnetron, said unbalanced section having a smaller characteristic impedance than said balanced section and said balanced section having a fixed electrical length substantially equal to $$\frac{\lambda_0}{8}(2n-1)$$

wherein $\lambda_0$ is the resonant frequency wavelength of the magnetron and $n$ is a small even integer, and line transformer means for coupling said balanced and said unbalanced sections of the line.

4. Tuning arrangement in accordance with claim 3, in combination with insulating means of an electrical length of at least approximately $\lambda_0/4$ for insulating the magnetron cavity from said line transformer for direct current and low frequency currents.

5. Tuning arrangement in accordance with claim 4 wherein said insulating means comprises thin walled ceramic tubes.

6. Tuning arrangement in accordance with claim 4 wherein said insulating means comprises thin walled quartz tubes.

7. A tuning arrangement as defined in claim 3 wherein the axes of said balanced section and of said unbalanced section are at right angles with one another.

8. A tuning arrangement as defined in claim 3 wherein said unbalanced section comprises a coaxial line having an outer conductor; a variable length inner conductor, said inner conductor comprising two colinear axially-spaced tubular inner sections, and a connecting conductor coaxially arranged within said sections to electrically connect said sections; and means for moving said connecting conductor longitudinally with respect to said tubular inner sections to vary the electrical length of said unbalanced section.

9. A tuning arrangement as defined in claim 8 and further including a fine tuning member arranged colinearly with respect to the longitudinal axis of said balanced section and capacitively coupled to said tubular inner sections.

10. A tuning arrangement as defined in claim 9 wherein said tubular inner sections have portions opposite said fine tuning member which are plane parallel surfaces.

11. A tuning arrangement as defined in claim 9 including means for varying the distance between said fine tuning member and said inner sections.

References Cited in the file of this patent

UNITED STATES PATENTS

| | | |
|---|---|---|
| 2,305,456 | Okabe | Dec. 15, 1942 |
| 2,426,185 | Doherty | Aug. 26, 1947 |
| 2,475,198 | Reinschmidt | July 5, 1949 |
| 2,589,259 | Isely | Mar. 18, 1952 |

FOREIGN PATENTS

| | | |
|---|---|---|
| 549,721 | Great Britain | Dec. 3, 1942 |